(12) United States Patent
Hachisuka

(10) Patent No.: US 8,490,373 B2
(45) Date of Patent: Jul. 23, 2013

(54) GRIP FOR PUSH MOWER

(75) Inventor: Tomohiro Hachisuka, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 13/206,052

(22) Filed: Aug. 9, 2011

(65) Prior Publication Data
US 2012/0047868 A1    Mar. 1, 2012

(30) Foreign Application Priority Data

Aug. 25, 2010    (JP) ................................. 2010-188451

(51) Int. Cl.
*A01D 34/00*    (2006.01)

(52) U.S. Cl.
USPC ................ 56/239; D15/14; D15/17; 180/19.3

(58) Field of Classification Search
USPC ... D15/14, 17; 180/19.3, 19.1, 6.48; 280/654, 280/655, 14.27; 56/DIG. 18, 229, 239, 16.7, 56/11.1, 10.5, 10.8
See application file for complete search history.

(56) References Cited

U.S. PATENT DOCUMENTS

| | | | | |
|---|---|---|---|---|
| 2,727,753 A | * | 12/1955 | Johnson et al. | 280/655.1 |
| 3,841,069 A | * | 10/1974 | Weck | 56/10.5 |
| 4,003,190 A | * | 1/1977 | Braun et al. | 56/10.5 |
| 4,430,848 A | * | 2/1984 | Wistrom | 56/11.3 |
| 4,493,180 A | * | 1/1985 | Wick | 56/11.3 |
| 4,878,339 A | | 11/1989 | Marier et al. | |
| 5,203,147 A | * | 4/1993 | Long | 56/10.1 |
| D346,810 S | * | 5/1994 | Schulz et al. | D15/14 |
| 5,361,568 A | * | 11/1994 | Lin | 56/194 |
| D390,576 S | * | 2/1998 | Shimamura | D15/14 |
| 5,882,030 A | * | 3/1999 | Haut | 280/642 |
| D421,265 S | * | 2/2000 | Ohsumi et al. | D15/14 |
| D424,578 S | * | 5/2000 | Friberg et al. | D15/18 |
| 6,082,083 A | * | 7/2000 | Stalpes et al. | 56/11.6 |
| 6,101,678 A | * | 8/2000 | Malloy et al. | 16/438 |
| D456,030 S | * | 4/2002 | Maeda | D15/14 |
| D457,533 S | * | 5/2002 | Concari et al. | D15/14 |
| D458,277 S | * | 6/2002 | Stratford | D15/14 |

(Continued)

FOREIGN PATENT DOCUMENTS

| | | |
|---|---|---|
| DE | 34 04 630 A1 | 8/1985 |
| DE | 35 03 936 A1 | 8/1986 |

(Continued)

OTHER PUBLICATIONS

Jan. 13, 2012 Search Report issued in the European Patent Application No. EP11177713.2.

(Continued)

*Primary Examiner* — Árpád Fábián-Kovács
(74) *Attorney, Agent, or Firm* — Oliff & Berridge, PLC

(57) ABSTRACT

A push mower comprises a mower main body, at least one arm extending upward toward a rear side from the mower main body, and a grip located at a tip end of the at least one arm. Each end of the grip is located on one plane side of an arm plane, a center of the grip is located on an opposite plane side of the arm plane, and therefore the grip extends so as to intersect with the arm plane. Here, the arm plane means a virtual plane on which the at least one arm is located and that is parallel to a left-to-right direction of the mower main body.

15 Claims, 5 Drawing Sheets

U.S. PATENT DOCUMENTS

| | | | | |
|---|---|---|---|---|
| D461,830 S | * | 8/2002 | Stratford et al. | D15/14 |
| 6,708,473 B2 | * | 3/2004 | Nicolay et al. | 56/16.7 |
| 6,745,548 B1 | * | 6/2004 | Phillip et al. | 56/10.5 |
| 6,860,334 B2 | * | 3/2005 | Yamazaki et al. | 172/42 |
| D544,501 S | * | 6/2007 | Chung Lee | D15/14 |
| 7,496,990 B2 | * | 3/2009 | Qiao | 16/437 |
| D605,667 S | * | 12/2009 | Peterson et al. | D15/14 |
| D620,029 S | * | 7/2010 | Baetica | D15/14 |
| D620,030 S | * | 7/2010 | Baetica | D15/14 |
| 7,762,050 B1 | * | 7/2010 | Kaskawitz | 56/10.8 |
| D622,291 S | * | 8/2010 | Martin et al. | D15/14 |
| D627,372 S | * | 11/2010 | Baetica | D15/14 |
| D642,595 S | * | 8/2011 | Martin et al. | D15/11 |
| D646,698 S | * | 10/2011 | Park | D15/14 |
| D648,354 S | * | 11/2011 | Hattori et al. | D15/17 |
| D648,754 S | * | 11/2011 | Yuzuriha | D15/17 |
| 2006/0053762 A1 | * | 3/2006 | Stover et al. | 56/16.7 |

FOREIGN PATENT DOCUMENTS

| | | |
|---|---|---|
| EP | 1 597 955 A1 | 11/2005 |
| FR | 2 755 573 A1 | 5/1998 |
| JP | A-11-346530 | 12/1999 |
| JP | 2009225693 A * | 10/2009 |
| JP | A-2009-225693 | 10/2009 |

OTHER PUBLICATIONS

European Office Action mailed Sep. 12, 2012 for European Patent Application No. 11 177 713.2.

* cited by examiner

GRIP FOR PUSH MOWER

CROSS-REFERENCE TO A RELATED APPLICATION

This application claims priority to Japanese Patent Application No. 2010-188451 filed on Aug. 25, 2010, the contents of which are hereby incorporated by reference into the present application.

TECHNICAL FIELD

The present invention relates to a push (walk-behind) mower.

DESCRIPTION OF RELATED ART

Push mowers are disclosed in Japanese Patent Application Publications No. H11-346530 (Patent Document 1) and No. 2009-225693 (Patent Document 2). These mowers have a mower main body having a blade and an arm extending from the lower main body. A grip that is gripped by the user is provided at a distal end of the arm. The user can cut the lawn by gripping the grip and walking, while pushing the mower.

SUMMARY OF THE INVENTION

A grip that is easy to grip and also easy to push is required for a push mower. Accordingly, the present invention provides a grip for a push mower that is easy to grip and push.

In accordance with the present invention, in a push mower, the grip intersects an arm plane. As a result, the grip can be easily gripped and easily pushed. The arm plane as referred to herein is a virtual plane on which the arm is located and that is parallel to a left-to-right direction of the mower.

To realize the abovementioned technical idea, the inventors have investigated the grips of the mowers disclosed in Patent Documents 1 and 2. As a result, the person conducting the test of the grip of the mower disclosed in Patent Document 1 has concluded that the grip feels easy to push, but difficult to grip. By contrast, the person conducting the test of the grip of the mower disclosed in Patent Document 2 has concluded that the grip of the mower feels easy to grip, but difficult to push.

In the mower disclosed in Patent Document 1, the grip is positioned at the arm plane. Where the grip is positioned at the arm plane, the force applied by the user to the grip is transmitted directly to the mower main body along the arm. In this case, since the arm cannot bend or rotate with respect to the mower main body, the grip feels easy to push. Where the grip is positioned at the arm plane, when the user grips the grip, the user's palms face up or down. Usually, where a person raises a hand forward, the palm is naturally tilted inward, instead of facing directly up or down. Therefore, where the user's palms face up or down when the user grips the grip, the hands are twisted and, therefore, the user feels that the grip is difficult to grip. In particular, where the grip is continuously gripped over a long period, the user easily feels fatigued.

In the mower disclosed in Patent Document 2, the grip is configured to form an angle with respect to the aim plane. Where the grip forms an angle with respect to the arm plane, the user can grip the grip from above or below so that the palms face inward. Therefore, the user feels that the grip is easy to grip. However, in the mower disclosed in Patent Document 2, the entire grip is positioned at one side with respect to the arm plane. With such a structure, when the user pushes the grip, a rotation moment is generated with respect to the arm, the arm is bent, and the arm is rotated with respect to the mower main body. As a result, the user feels that the grip is difficult to push.

In view of the above-described knowledge, in accordance with the present invention, the grip of the mower intersects the arm plane. With such a configuration the grip forms an angle with the arm plane and, at the same time, part of the grip is located at the arm plane. Since the grip forms an angle with the arm plane, the user can grip the grip so that the palms face inward. Since part of the grip is located at the arm plane, the user can push the grip along the arm. As a result, the user can feel that the grip is easy to grip and easy to push.

DETAILED DESCRIPTION OF THE INVENTION

Figure 1:
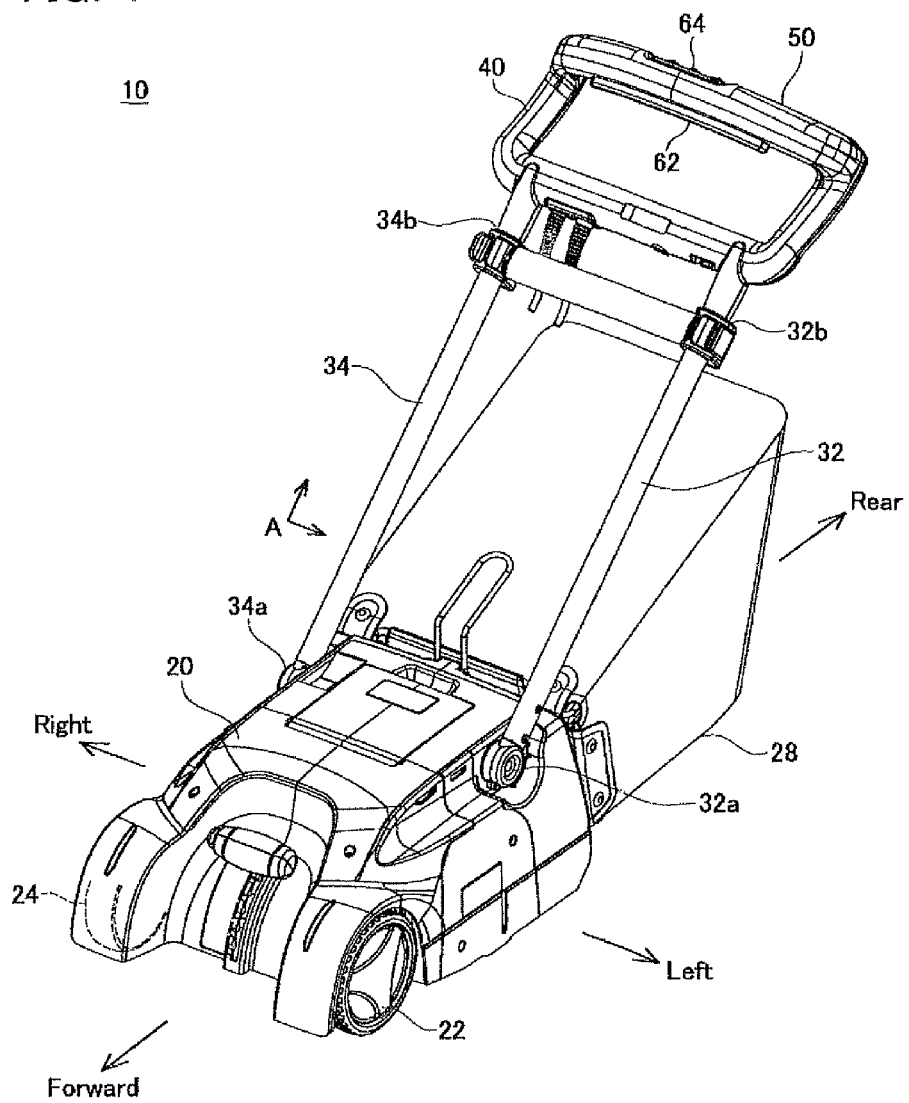
FIG. 1 is a perspective view of a push mower according to an embodiment.

In an embodiment of the present invention, a push mower preferably includes a mower main body, at least one arm extending upward toward a rear side from the mower main body, and a grip located at a tip end of the at least one arm. The grip intersects with an arm plane. The at least one arm may be rotatably supported by the mower main body. In this case, a rotation axis of the at least one arm may preferably extend in the left-to-right direction and be parallel to the arm plane. More preferably, the rotation axis of the at least one arm may be included within the arm plane.

In an embodiment of the present invention, both ends of the grip are located at one plane side of the arm plane and a center of the grip is located at an opposite plane side of the arm plane. In such a structure, since the grip intersects with the arm plane at least twice, when the user grips the grip with both hands, two locations where the grip intersects with the arm plane can be gripped by the left and right hand, respectively.

In the above-described embodiments, both ends of the grip can be located at a lower side of the arm plane and the center of the grip can be located at an upper side of the arm plane. Alternatively, both ends of the grip can be located at the upper side and the center of the grip can be located at the lower side of the arm plane. The verification performed by the inventors has confirmed that most of the people who tested the mower felt that the former structure is easy to use, but there were some who felt that the latter structure is easy to use.

It is more preferred that the above-described grip intersects an extension line of the arm. With such a structure, the user can grip the grip on the extension line of the arm, and the grip can be easily pushed along the arm.

It is preferred that the abovementioned grip extends along a plane forming an angle with the arm plane, in particular along the plane perpendicular to the arm plane. With such a structure, when the user pushes the grip along the arm, the user's hands gripping the grip are unlikely to slide.

In one embodiment of the present invention, the grip is separated into a left grip and a right grip, and each of the left and right grips intersects with the arm plane.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved push mower, as well as methods for using and manufacturing the same.

Moreover, combinations of features and steps disclosed in the following detail description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment

FIG. 1 shows a mower 10 according to an embodiment. The mower 10 is of a push type (walk-behind type). Thus, the user mows the lawn, by walking, while pushing the mower 10.

As shown in FIG. 1, the mower 10 includes a mower main body 20, a left arm 32 and a right arm 34 extending upward toward a rear side from the mower main body 20, a handle unit provided at the left arm 32 and the right arm 34, and a grass collecting bag 28 provided at the rear side of the mower main body 20. The mower main body 20 has a plurality of wheels 22, 24 (some of the wheels are not shown in the figure) and is configured to be capable of traveling on the lawn. The mower main body 20 has a blade (not shown in the figure) for cutting the lawn and a motor (not shown in the figure) that drives the blade.

The left arm 32 and the right arm 34 extend parallel to each other from the mower main body 20. A proximal end 32a of the left arm 32 is attached to the left side surface of the mower main body 20 and supported to be rotatable with respect to the mower main body 20. A proximal end 34a of the right arm 34 is attached to the right side surface of the mower main body 20 and supported rotatably with respect to the mower main body 20. The rotation axes of the arms 32, 34 are parallel to a left-to-right direction of the mower main body 20, and the rotation axes of the left and right arms 32, 34 are located on the same straight line. Note that the left-to-right direction of the mower main body 20 is parallel to an axle of the wheels 22, 24 and is perpendicular to a direction of travel of the mower main body 20.

A handle unit 40 is fixed to a tip end 32b of the left arm 32 and a tip end 34b of the right arm 34, The handle unit 40 is provided with a grip 50 that is gripped by the user, a main switch 62 provided at the lower surface of the grip 50, and a lock switch 64 provided at the upper surface of the grip. The main switch 62 and the lock switch 64 are operated by the user gripping the grip 50. The main switch 62 serves to drive/stop the blade of the mower main body 20, and the lock switch 64 serves to lockJunlock the main switch 62.

A method for using the mower 10 will be explained below. The user grips the grip 50 with the two hands at the rear side of the mower 10 and walks, while pushing the mower 10. In this case, the user releases the lock of the lock switch 64 and operates the main switch 62. The motor drives the blade in the mower main body 20 in response to the operation of the main switch 62. The mower main body 20 travels on the lawn, while being pushed by the user, and cuts the lawn with the blade. The method for using the mower 10 according to the present embodiment is not specifically different from that of the conventional mower.

Figure 2:
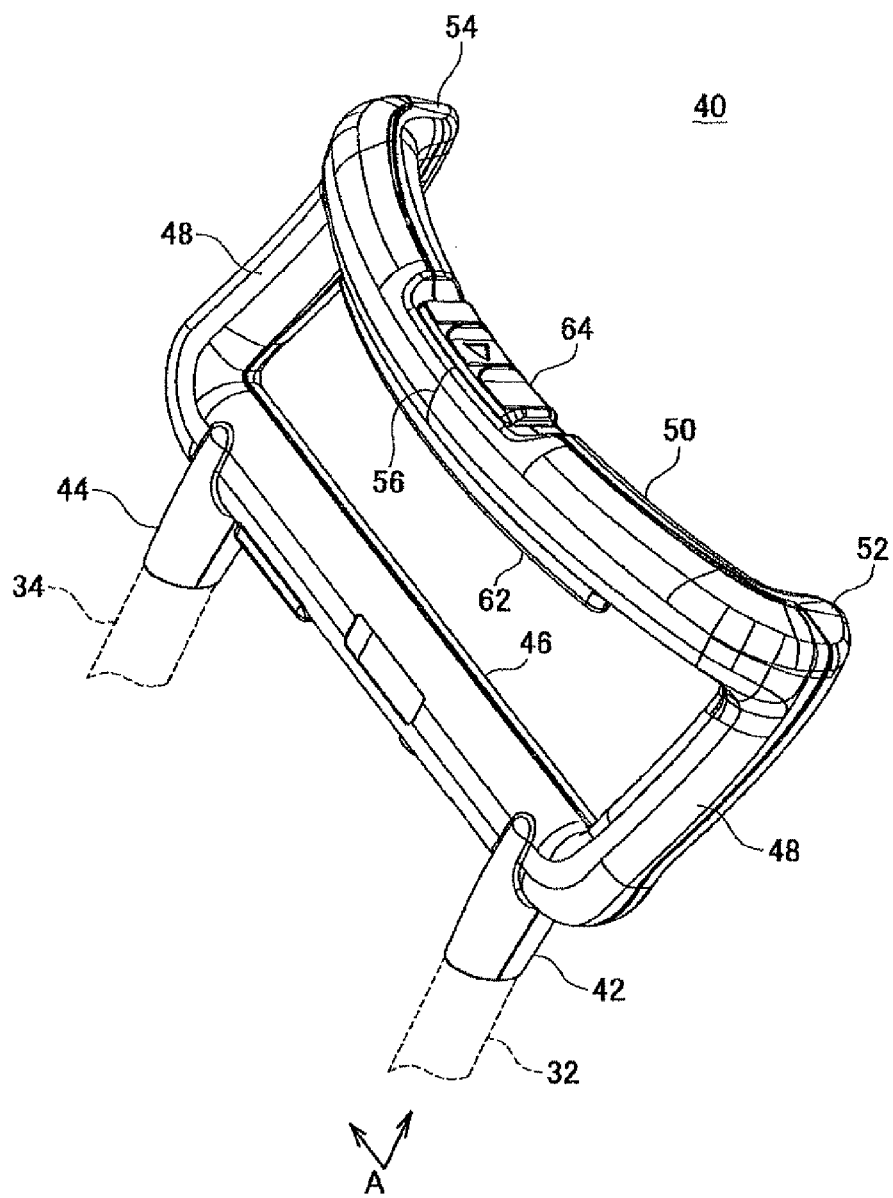
FIG. 2 is a perspective view of a handle unit according to the embodiment.
Figure 3:
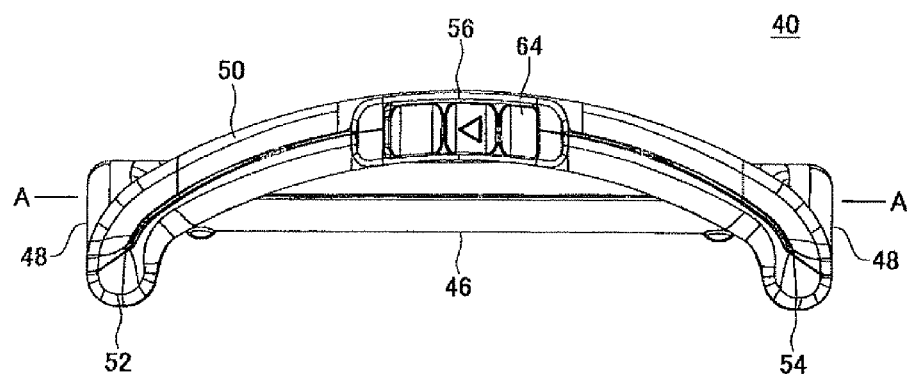
FIG. 3 is a plan view of the handle unit according to the embodiment.
Figure 4:
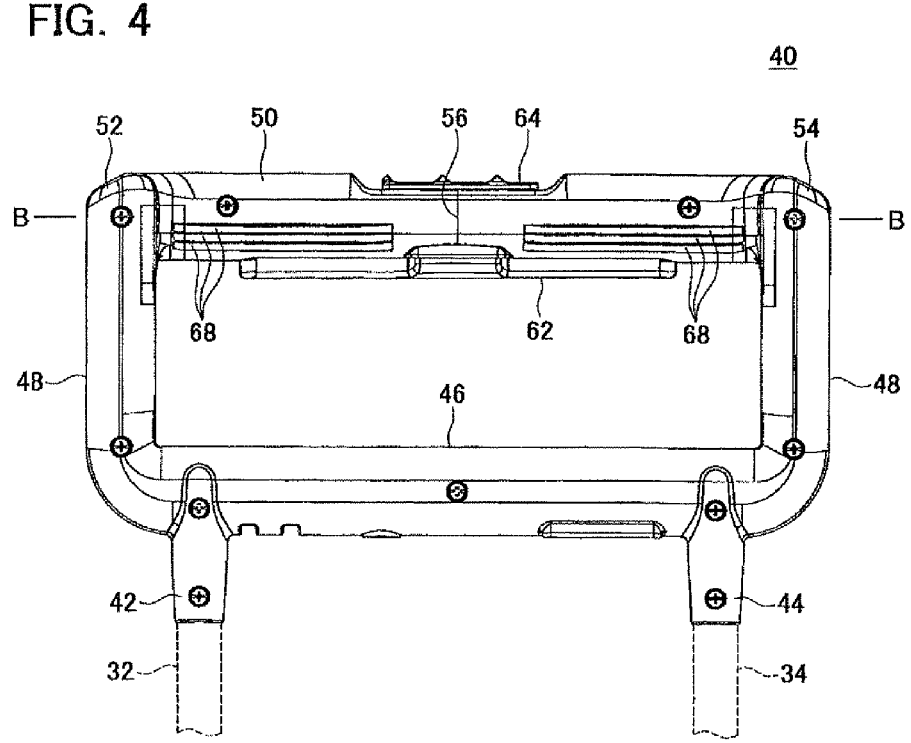
FIG. 4 is a rear view of the handle unit according to the embodiment.
Figure 5:
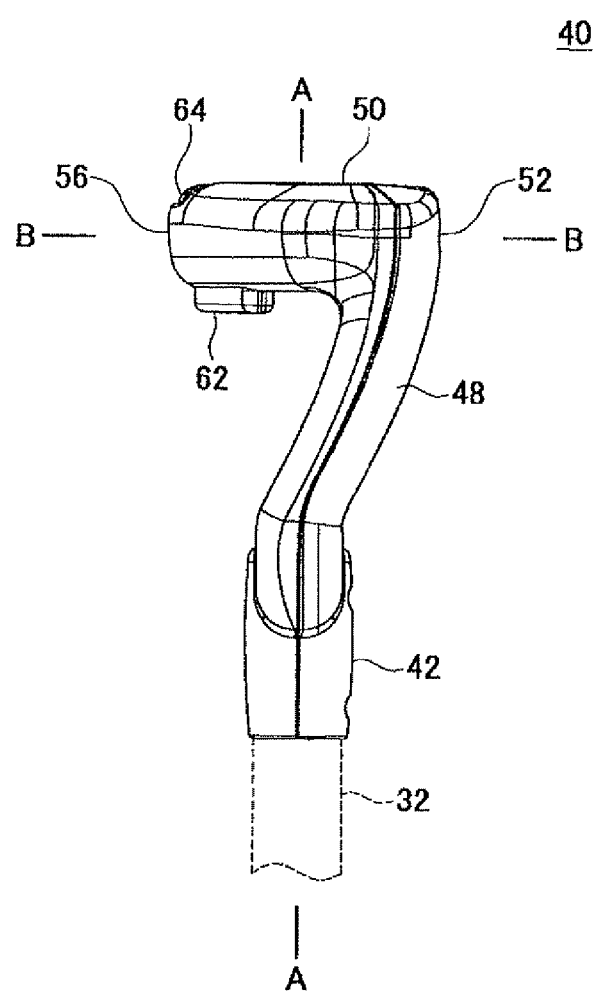
FIG. 5 is a right-side view of the handle unit according to the embodiment.

The structure of the handle unit 40 will be explained below with reference to FIGS. 2 to 5. FIG. 2 is a perspective view of the handle unit 40. FIG. 3 is a plan view of the handle unit 40. FIG. 4 is a rear view of the handle unit 40. FIG. 5 is a right side view of the handle using 40 and shows a left side surface of the handle unit 40.

The handle unit 40 has a lower beam portion 46 extending in the left-to-right direction, a pair of side columnar portions 48 extending from respective ends of the lower beam portion 46, and the grip 50 connecting the upper ends of the pair of side columnar portions 48. The lower beam portion 46, pair of side columnar portions 48, and grip 50 are connected in series, and the handle unit 40 has a substantially rectangular parallelepiped loop-like shape. A left socket portion 42 fixed to the left arm 32 and a right socket portion 44 fixed to the right arm 34 are provided at the lower beam portion 46. Each side columnar portion 48 is tilted rearward (downward) toward the upper end connected to the grip 50. As shown in FIG. 4, a plurality of slip-proof grooves 68 is formed in the grip 50 along the longitudinal direction of the grip 50. The slip-proof grooves 68 are all formed in a region of the grip 50 that is gripped by the user.

The grip 50 is curved in an arch-like form and has a left-right symmetrical shape. In this configuration, the grip 50 is not parallel to an arm plane A and extends along a plane B perpendicular to the arm plane A. The arm plane A as referred to herein means a virtual plane on which the left and right arms 32, 34 are located and that is parallel to the left-to-right direction of the mower 10. With the grip 50 of such a shape, when the user grips the grip 50 with the left and right hands, the palms slightly face inward. Such a posture is close to that attained when the user naturally raises hands forward. Therefore, the user can easily keep holding the grip 50. Further, since the grip 50 extends along the plane B perpendicular to the arm plane A, the user's hands gripping the grip 50 are unlikely to slip even when the user strongly pushes the mower 10.

In the push mower 10, the user gripping the grip 50 should push the grip 50 along the left and right arms 32, 34. Otherwise, a rotation moment will be generated in the left and right arms 32, 34, which causes the left and right arms 32, 34 rotatably supported to shake with respect to the mower main body 20. To solve this problem, in the handle unit 40 according to the present embodiment, the grip 50 is disposed so as to intersect with the plane A. With such a configuration, the user can grip the portion of the grip 50 that intersects with the arm plane and can push the grip straight along the left and right arms 32, 34.

In particular, in the handle unit 40 according to the present embodiment, both ends 52, 54 of the grip are located at one plane side of the arm plane A and a center 56 of the grip is located at an opposite plane side of the arm plane A. Therefore, the grip 50 intersects with the arm plane A for the first time within a range from the left end 52 to the center 56 and intersects with the arm plane A for the second time within a range from the center 56 to the right end 54. With such a configuration, the user can grip the two locations where the grip 50 intersects with the arm plane A with the left and right hand, respectively.

In particular, in the handle unit 40 according to the present embodiment, the grip 50 is configured to intersect with extension lines of the left and right arms 32, 34. With such a configuration, the user can grip the grip 50 on the extension lines of the left and right arms 32, 34 and can push the grip 50 straight along the left and right arms 32, 34.

In the above-described embodiment, the grip 50 extends along the plane B perpendicular to the arm plane A. However, the plane B where the grip 50 is located is not necessarily perpendicular to the plane A. The grip 50 may extend along the plane forming an angle of 60 degrees, 120 degrees, or 135 degrees with the arm plane A. Alternatively, a configuration is preferred in which the angle of the plane B where the grip 50 is located can be adjusted with respect to the plane A.

In the above-described embodiment, the grip 50 is curved in an arch-like form. However, the grip 50 may alternatively be bent in a V-like shape, or curved in a U-like shape. The shape of the grip 50 is not particularly limited, provided that the portion thereof that is gripped by the user intersects with the arm plane A.

In the above-described embodiment, the mower 10 has a pair of left and right arms 32, 34. However, the mower 10 may have a single arm or may have three or more arms.

Figure 6:
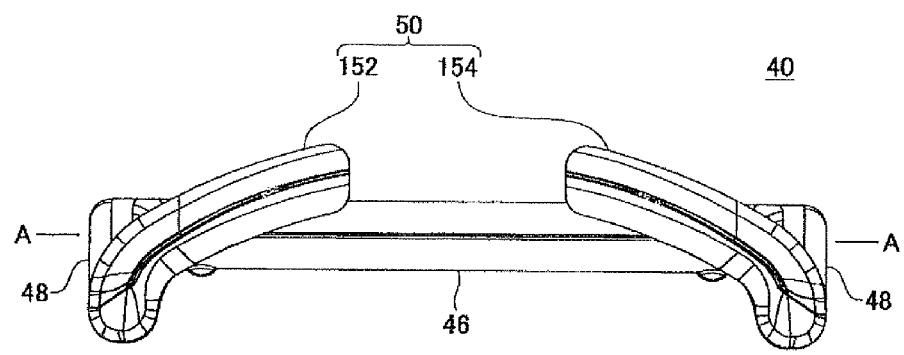
FIG. 6 is a plan view illustrating the variation example of the handle unit.

As shown in FIG. 6, in the handle unit 40, a pair of grips 50 constituted by a left grip 152 and a right grip 154 can be also provided. In the handle grip 40 shown in FIG. 6, the right grip 152 intersects with the arm plane A and the right grip 154 also intersects with the arm plane A. With such a configuration the user can also easily grip the pair of grips 50 and can push the grip 50 along the left and right arms 32, 34. When the mower main body 20 is of a comparatively small size, the user can push the mower 10 with only one hand. Therefore, only one of the left and right grips 152, 154 may be provided at the handle unit 40. The handle unit 40 may not necessarily have the substantially rectangular parallelepiped loop-like shape.

In the handle unit 40 according to the above-described embodiment, the grip 50 may be curved or bent reversely. Thus, in the handle unit 40 shown in FIGS. 1 to 5, when the user grips the grip 50 at the rear side of the mower main body 20, both ends 52, 54 of the grip 50 are located at the lower plane side of the arm plane A and the center 56 of the grip 50 is located at the upper plane side of the arm plane A.

Figure 7:
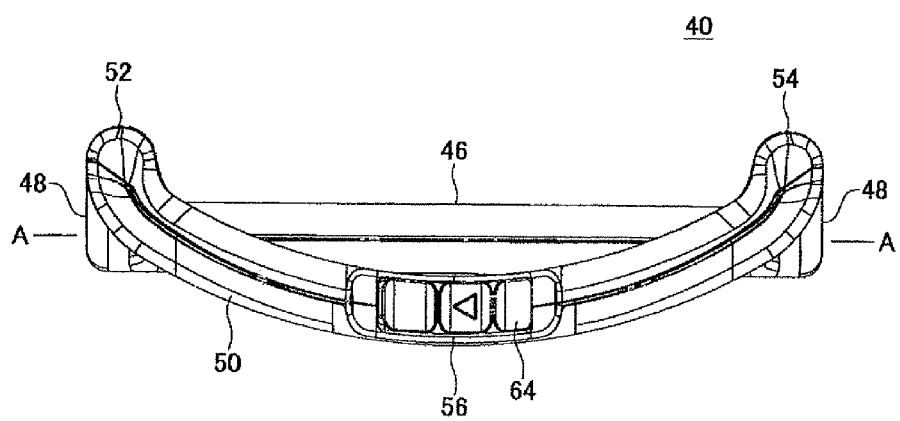
FIG. 7 is a plan view illustrating another variation example of the handle unit.

By contrast, the variation example of the handle unit 40 shown in FIG. 7 is configured such that when the user grips the grip 50 at the rear side of the mower main body 20, both ends 52, 54 of the grip 50 are located at the upper plane side of the arm plane A and the center 56 of the grip 50 is located at the lower plane side of the arm plane A. With such handle unit 40, the user can grip the grip 50 from below so that the backs of the left and right hands face down. In this case, the palms of the hands face slightly inward and the user's hands assume a natural posture, thereby making it possible for the user to hold the grip easily in a continuous manner.

What is claimed is:

1. A push mower comprising:
    a mower main body;
    a first grip configured to be gripped by one hand of a user, the first grip having a first curved portion;
    a second grip configured to be gripped by another hand of the user, the second grip having a second curved portion;
    two arms, comprising a first arm and a second arm, extending upward toward a rear side from the mower main body, each of the two arms comprising a base end and tip end, the mower main body being located at and configured to be attached to the base end of each arm of the two arms; and
    a first connecting portion and a second connecting portion that respectively extend from the first arm and the second arm toward the respective first grip and second grip, wherein
    each of the two arms has a straight section that linearly extends between the base end and the tip end, and each straight section of the two arms having a longitudinal axis that linearly extends along a center of the straight section,
    the straight sections of the two arms define an arm plane, wherein the arm plane is a virtual plane containing each longitudinal axis of the straight sections of the two arms,
    the first and the second curved portions extend along a common plane that intersects with the arm plane,
    the first connecting portion and the second connecting portion each extend out of the arm plane in a direction toward one side of the arm plane,
    the first grip extends from a part of the first connecting portion that is located on the one side of the arm plane, and the second grip extends from a part of the second connecting portion that is located on the one side of the arm plane, and
    the first and the second curved portions extend from the one side of the arm plane to the other side of the arm plane and pass through the arm plane.

2. The push mower as in claim 1, wherein
    the first and second connecting portions extend to a lower side of the arm plane,
    the first grip extends from the part of the first connecting portion to an upper side of the arm plane, and
    the second grip extends from the part of the second connecting portion to the upper side of the arm plane.

3. The push mower as in claim 1, wherein
    the first and second grips each intersect grip intersects with a virtual line that is coaxial with the first arm, and
    the second grip intersects with a virtual line that is coaxial with the second arm.

4. The push mower as in claim 1, wherein the first grip and the second grip are connected with each other.

5. The push mower as in claim 1, wherein the common plane along which the first and the second curved portions extend is perpendicular to the arm plane.

6. The push mower as in claim 1, wherein the first and the second grips are separated from each other.

7. The push mower as in claim 1, wherein the base end of each of the two arms is directly connected to the mower main body so as to be connected rotatably about a common rotation axis with respect to the mower main body, and the common rotation axis is parallel to the arm plane.

8. The push mower as in claim 1, each of the first and the second curved portions has an arc-like shape.

9. The push mower as in claim 1, wherein
    the first and second curved portions are positioned to pass through the arm plane such that, when a user grips the first and second grips, the user's hands are positioned at the arm plane so that the user can exert force in the arm plane.

10. The push mower as in claim 1, wherein
the first and second connecting portions extend from the tip ends of the first and second arms, respectively.

11. The push mower as in claim 1, wherein each of the first and second connecting portions has a columnar shape.

12. The push mower as in claim 1, wherein
the first connecting portion connects to a first end of the first grip, and
the second connecting portion connects to a first end of the second grip.

13. The push mower as in claim 1, wherein
the first and second connecting portions extend rearwardly, with respect to the mower main body, from the first and second arms towards the first and second grips, respectively.

14. A push mower comprising:
a mower main body;
a first grip configured to be gripped by one hand of a user, the first grip having a first curved portion, the first curved portion having a center axis extending coaxially with the first curved portion;
a second grip configured to be gripped by another hand of the user, the second grip having a second curved portion, the second curved portion having a center axis extending coaxially with the second curved portion;
two arms, comprising a first arm and a second arm, extending upward toward a rear side from the mower main body, each of the two arms comprising a base end and tip end, the mower main body being located at and configured to be attached to the base end of each of the two arms; and
a first connecting portion and a second connecting portion that respectively extend from the first arm and the second arm toward the respective first grip and second grip, wherein
each of the two arms has a straight section that linearly extends between the base end and the tip end, and each straight section of the two arms having a longitudinal axis that linearly extends along a center of the straight section,
the straight sections of the two arms define an arm plane, wherein the arm plane is a virtual plane containing each longitudinal axis of the straight sections of the two arms,
the center axis of the first curved portion and the center axis of the second curved portion extend along a common plane that intersects with the arm plane,
the first connecting portion and the second connecting portion each extend out of the arm plane in a direction toward one side of the arm plane,
the first grip extends from a part of the first connecting portion that is located on the one side of the arm plane, and the second grip extends from a part of the second connecting portion that is located on the one side of the arm plane, and
the center axis of the first and second curved portions extend from the one side of the arm plane to the other side of the arm plane and pass through the arm plane.

15. A push mower comprising:
a mower main body;
a first grip configured to be gripped by one hand of a user, the first grip having a first curved portion;
a second grip configured to be gripped by another hand of the user, the second grip having a second curved portion;
two arms, comprising a first arm and a second arm, extending upward toward a rear side from the mower main body, each of the two arms comprising a base end and tip end, the mower main body being located at and configured to be attached to the base end of each arm of the two arms; and
a first connecting portion and a second connecting portion that respectively extend from the first arm and the second arm toward the respective first grip and second grip, wherein
each of the two arms has a straight section that linearly extends between the base end and the tip end, and each straight section of the two arms having a longitudinal axis that linearly extends along a center of the straight section,
the straight sections of the two arms define an arm plane, wherein the arm plane is a virtual plane containing each longitudinal axis of the straight sections of the two arms,
the entireties of each of the first and the second curved portions extend in a common plane that intersects transversely with the arm plane,
the first connecting portion and the second connecting portion each extend out of the arm plane in a direction toward one side of the arm plane,
the first grip extends from a part of the first connecting portion that is located on the one side of the arm plane, and the second grip extends from a part of the second connecting portion that is located on the one side of the arm plane,
the first and the second curved portions extend from the one side of the arm plane to the other side of the arm plane and pass through the arm plane,
at least a portion of the first curved portion that intersects the arm plane is configured to be gripped by the one hand of the user,
at least a portion of the second curved portion that intersects the arm plane is configured to be gripped by the another hand of the user, and
the first curved portion is configured to be gripped by the one hand of the user such that a palm of the one hand is oriented to face inwardly toward the second curved portion, and the second curved portion is configured to be gripped by the another hand of the user such that a palm of the another hand is oriented to face inwardly toward the first curved portion.

* * * * *